United States Patent [19]

White

[11] Patent Number: 4,625,290
[45] Date of Patent: Nov. 25, 1986

[54] APPARATUS AND METHOD FOR PRODUCING A THREE-DIMENSIONAL DISPLAY ON A VIDEO DISPLAY DEVICE

[75] Inventor: Keith D. White, Gainesville, Fla.

[73] Assignee: University of Florida, Gainesville, Fla.

[21] Appl. No.: 547,952

[22] Filed: Nov. 2, 1983

[51] Int. Cl.$^4$ .................................................. G09B 9/08
[52] U.S. Cl. ...................................... 364/522; 358/88; 364/521
[58] Field of Search ......................... 364/521, 522, 518; 340/734; 350/131, 133; 356/390, 391; 358/88, 89, 90

[56] References Cited

U.S. PATENT DOCUMENTS

| 3,457,364 | 7/1969 | Carrillo | 178/6.5 |
| 3,674,921 | 7/1972 | Goldsmith | 178/5.4 R |
| 3,896,487 | 7/1975 | Tesler | 358/3 |
| 4,127,849 | 11/1978 | Okor | 340/324 AD |
| 4,160,973 | 7/1979 | Berlin, Jr. | 340/718 |
| 4,286,286 | 8/1981 | Jurisson et al. | 358/92 |
| 4,322,743 | 3/1982 | Rickert | 358/88 |
| 4,343,037 | 8/1982 | Bolton | 364/521 |
| 4,469,415 | 9/1984 | Radl | 350/131 X |
| 4,571,616 | 2/1986 | Haisma et al. | 358/88 |

OTHER PUBLICATIONS

Plott et al., "A Real Time Stereoscopic Small-Computer Graphics Display System", IEEE Transactions on Systems, Man, and Cybernetics, vol. SMC-5, No. 5, Sep. 1975, pp. 527-533.

Reuss et al, Microcomputer Generation of Dynamic Stereo Graphics for Clinical Use, IEEE Transactions on Biomedical Engineering, vol. BME-28, No. 1, Jan. '81, pp. 15-21.

Schumer et al, Independent Stereoscopic Channels for Different Extents of Spatial Pooling, Vision Research, vol. 19, pp. 1303-1314.

Ross et al, Short-Term Memory in Stereopsis, Vision Res., vol. 14, pp. 1195-1201.

Uttal et al, Parameters of Tachistoscopic Stereopsis, Vision Res., vol. 15, pp. 705-712.

Primary Examiner—Errol A. Krass
Assistant Examiner—H. R. Herndon
Attorney, Agent, or Firm—Dennis P. Clarke

[57] ABSTRACT

Dynamic random element stereograms are produced on a television receiver or video monitor by an interface circuit that generates first and second binary sequences which are applied to the display so as to display a plurality of pairs of elements, and relative delays are introduced between the two binary sequences during selected portions of an image defined by a video signal so that the disparity between elements of those pairs displayed during the selected portions is different from the disparity between elements displayed during non-selected portions, thereby causing the selected portions to appear to be at a different depth from the non-selected portions.

34 Claims, 10 Drawing Figures

FIG. 3.

| MODE | SELECTION SIGNALS J1 J2 | EQUIVALENT CONFIGURATION |
|---|---|---|
| A | 10 | 30 STAGE PRSG |
| B | 11 | 32 STAGE RECIRCULATING REGISTER |
| C | 00 | 15 STAGE PRSGs |
| D | 01 | 16 STAGE RECIRCULATING REGISTER |

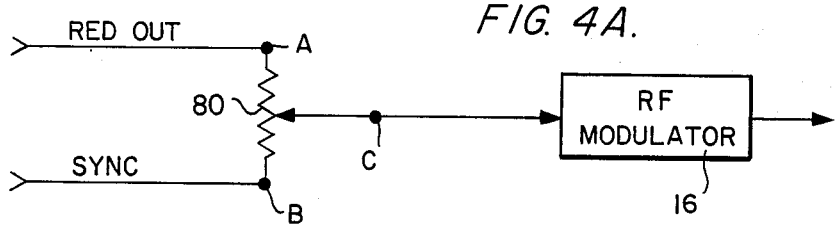

APPARATUS AND METHOD FOR PRODUCING A THREE-DIMENSIONAL DISPLAY ON A VIDEO DISPLAY DEVICE

BACKGROUND OF THE INVENTION

This invention relates generally to three-dimensional display apparatus and methods, and more particularly to apparatus and methods for producing dynamic stereograms for the clinical assessment and treatment of binocular vision problems.

There are many areas in which it is desirable or necessary to generate three-dimensional displays. Visual depth testing is one such area. The perception of depth in humans (and most animals) is a result of the combination of visual inputs from a pair of horizontally separated eyes, each of which sees a slightly different view of an object within the field of vision. Depth perception is derived from the horizontal disparity between corresponding image points in the two eyes and the brain which resolves the discrepancies between the images seen by each eye and interprets the discrepancies as differences in depth.

Orthoptics is the field of nonsurgical management of binocular vision problems, and includes the clinical assessment and treatment of such problems. An integral part of orthoptics is binocular visual stimulation using stereoptic test patterns for measuring binocular vision functioning and for improving binocular vision through active eye exercises. Such test patterns are typically designed to eliminate all monocular cues so that the image seen by either eye alone contains no information about the stimulus. Random element stereograms meet this requirement. Devices commonly employed for producing such test patterns include those which present stereo slide pairs at adjustable positions relative to the two eyes. Slides are easy to change, and may present a variety of different subjects, including random element stereograms. However, slides are disadvantageous in being limited to a static presentation, ruling out animation and motion in three dimensions, and it is often desirable to employ dynamic stereoptic test patterns, such as dynamic random element stereograms.

The advantages of dynamic random element stereography for the clinical assessment and treatment of binocular vision problems has long been recognized, and equipment capable of producing such stereograms is available. However, available equipment is generally rather complex and expensive, and may involve, for example, a computer system employing a random access memory having a capacity sufficient store data corresponding to each individual element of a video display, a dedicated microprocessor to address and read the memory, and a high speed direct memory access port to a host computer. The host computer contains software for generating the video images to be displayed, calculates the data for each element of the display, causes the data to be stored in memory and to be updated as necessary, and controls the dedicated microprocessor which addresses and reads the memory to supply the data to a video display device for each frame of the display. Since the video display must be generated and refreshed each frame, the software is typically written in assembly language, which further complicates the system and makes changes difficult. A system of this type is disclosed, for example, by Reuss and Kertez, IEEE Transactions on Biomedical Engineering, Vol. BME-28, No. 1, January 1981.

It is desirable to provide apparatus and methods for producing three dimensional video displays, such as dynamic random element stereograms, that avoid the foregoing disadvantages, and it is to this end the present invention is directed.

SUMMARY OF THE INVENTION

The invention provides a rather simple and inexpensive apparatus and method for producing three dimensional displays, such as dynamic random element stereograms (hereinafter DRES), on a video display device, comprising a rather simple interface circuit that converts a video signal into a three dimensional display on a video device. The video signal may be derived, for example, from a camera or, preferably, from an inexpensive home computer capable of producing black and white graphics, and a conventional black and white or color television receiver or monitor may be employed as a display device.

Briefly stated, in one aspect the invention involves generating signals corresponding to element pairs that are displayed on a video display device, and the signals are displayed as element pairs. A video signal defining a predetermined image is generated, and the video signal is employed for producing disparity between the elements of those pairs that are displayed during selected portions of the image such that one element of each such pair is delayed relative to the other element of the pair, thereby causing the selected portions to appear to be at a different depth or distance from a viewer than the non-selected portions of the image.

BRIEF DESCRIPTION OF THE DRAWINGS

FIG. 3 illustrates different sequence-generating modes of a binary sequence generator of the interface apparatus and the equivalent sequence generator configuration for each mode;

FIGS. 4A-B are schematic diagrams of circuit modifications to the system of FIG. 1 to afford a split screen display; and FIGS. 5A-E illustrate the waveforms present at various points in the circuits of FIG. 4A and B.

DESCRIPTION OF THE PREFERRED EMBODIMENTS

Figure 1:
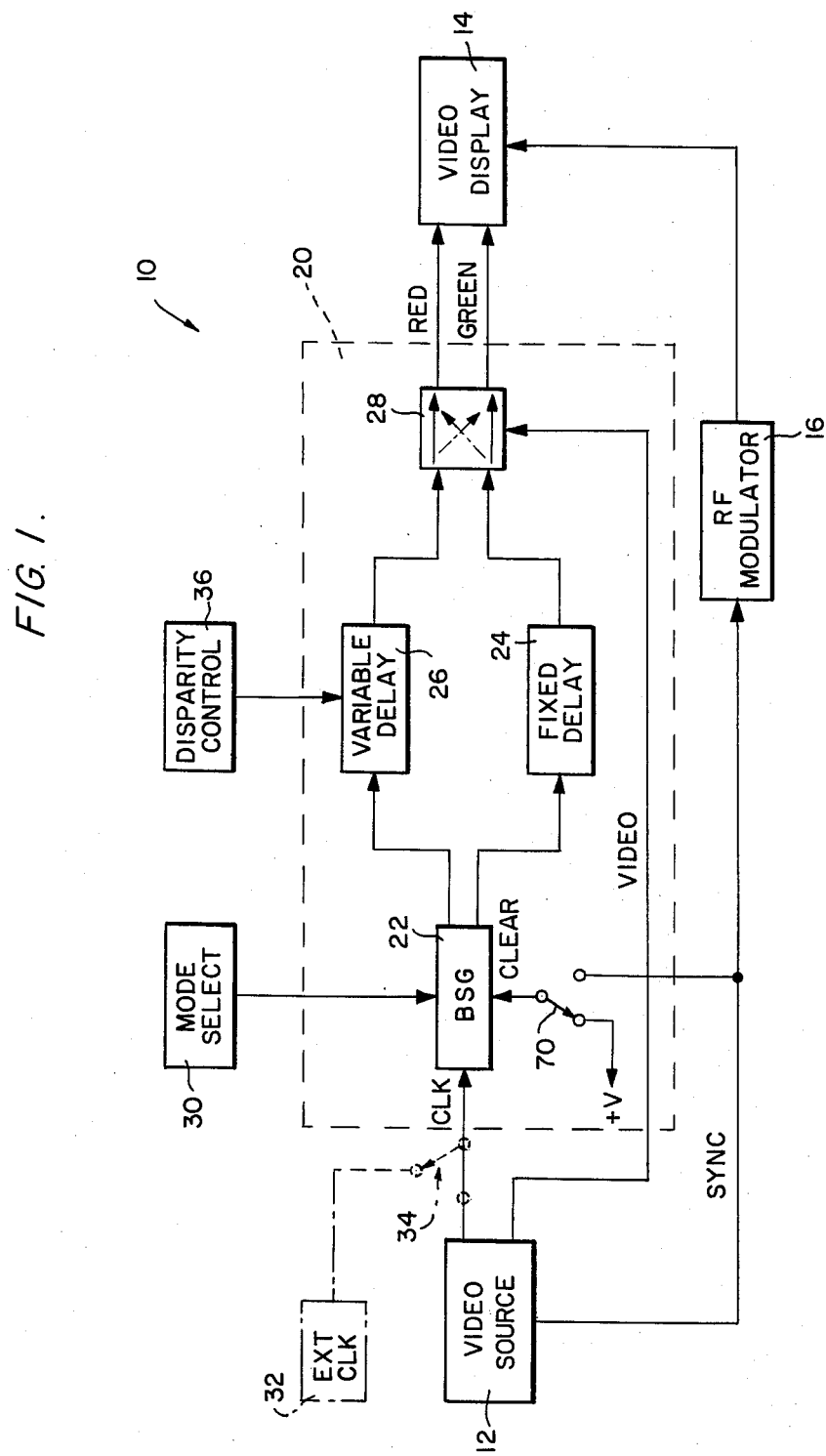
FIG. 1 is a block diagram of a system embodying interface apparatus in accordance with the invention.

As indicated above, the invention is particularly well adapted to the production of dynamic random element stereograms (DRES) for the clinical assessment and treatment of binocular vision problems and will be described in that environment. However, as will become apparent, this is illustrative of only one utility of the invention.

A random element stereogram consists of patterns of randomly placed paired elements, e.g., dots, on a display which, if viewed with a stereoscope, fuse to look three dimensional. Each dot on one part of the random dot stereogram has a corresponding dot on another part, but the dots of the pairs within a preselected delimited area, for example, a central square, are displaced horizontally relative to each other. The disparity, or displacement, of the dots of the pairs within the delimited area gives rise to the perception that these dots are standing free in space from the dots of the surrounding area. The direction of the relative horizontal displacement of the dots determines whether the delimited area appears to be in front of or behind the plane of the surrounding area, and the amount of relative displacement determines the extent of depth perceived. Each part of the stereogram appears to have a completely random texture. With a dynamic random element stereogram, the dot patterns are regenerated in rapid succession with the dots placed randomly and independently of preceeding presentations. At any given instant, however, each dot in one part of the stereogram still has a corresponding twin in the other part of the stereogram, and the dots of pairs located within the delimited area will have a different disparity from the dots located in the surrounding area. When viewed monocularly, the patterns resemble, for example, snow on a poorly tuned television and the delimited area cannot be distinguished from the surrounding area. When viewed stereoscopically, the snow appears to be at one depth for the delimited area, and at a different depth for the surrounding area. DRES may also be created with elements other than dots. For example, elements resembling line segments, squares or other geometric figures, as well as luminance variations may be employed.

As will be described shortly, the invention enables stereograms (dynamic as well as static and random as well as non-random) to be presented on a video display device, such as a conventional black and white or color television receiver or monitor. The invention affords two different methods of stereogram presentation. The first is an anaglyph method that may be used with a color video display device. The two dots of a pair are of different colors (red and green, for example) and are displayed adjacent to one another on the screen. The screen is viewed through chromatic filters. The second method is a split screen method that may be employed with a black and white video display device, wherein the two dots of a pair are located on different halves of the screen, and the "image" on one half of the screen is the inverse of that on the other half. The two halves of the screen are presented to different eyes with the aid of a septum or similar device. The DRES presentations afforded by the invention also enable the depiction of continuously changing depth (by continuously varying the disparity), and further enable disparities approximating the stereoacuity threshold (a visual angle subtending several arc seconds). With the invention, disparity is independent of element size and is controlled in an analog fashion that permits arbitrarily small disparities. This is in marked contrast to most known computer-based DRES systems where the smallest non-zero disparity is the same size as one display pixel (several arc minutes of visual angle).

FIG. 1 is a block diagram of a system 10 incorporating apparatus in accordance with the invention for producing anaglyph presentations. As shown, system 10 may comprise a video source 12 which generates a video signal corresponding to a predetermined image, a video sync signal, and a clock (CLK) signal. The system further includes a color video display device 14 for displaying the stereograms. Display device 14 may be either a conventional color television (TV) receiver or a color monitor. If a TV receiver is employed as the display device, the video sync signal may be supplied to the antenna terminals of the TV via a conventional RF modulator 16. If, instead, the video display device is a monitor, an RF modulator is unnecessary and the sync signal may be applied directly to the monitor.

As shown in the figure, the video signal and the clock signal from the video source are applied to an interface circuit 20 which provides two output color signals (red and green, for example) which are used to drive corresponding color guns of the video display device. Interface circuit 20 may comprise a binary sequence generator (BSG) 22 which generates binary sequences having logic "1" and "0" states. The binary sequences from generator 22 may be applied in parallel to a fixed delay 24 and to a variable delay 26. The outputs from the fixed delay and the variable delay are applied to a gating control switch 28 which provides the two output color signals. Switch 28 is driven by the video signal from the video source and functions as a two pole transfer switch to switch the binary sequences output from the fixed and variable delays between the red and green inputs to the video display device.

As will be described more fully shortly, the binary sequence generator preferably has different operating modes in which different binary sequences are generated, which modes may be selected by a mode selection device 30. The binary sequence generator serves as an element or dot generator for producing elements or dots on the video display. It may be driven by the clock signal from the video source or by an external clock generator 32, either of which may be selected by a switch 34. The clock signal may be synchronous or asynchronous with respect to the video signal. Variable delay 26 establishes the disparity between the elements or dots of the element pairs of the stereograms, and the disparity may be controlled by a disparity control device 36. Interface circuit 20 may be constructed from a small number of rather inexpensive integrated circuits, as will be described hereinafter. Video source 12 is preferably a microcomputer capable of generating black and white graphics, and may be any of a number of commercially available inexpensive home or personal computers. Such computers are convenient since they may be easily programmed to create different graphics patterns, for example, simple geometrical patterns, and are a convenient source of clock and sync signals for the interface circuit and the video display. A video camera, however, may also be employed as a signal source.

Interface circuit 20 translates a graphics or video pattern generated by the video source into a three-dimensional stereogram presentation on the video display device. In the anaglyph method, the red gun produces the elements or dots for one part of the stereogram and the green gun produces the twin dots for the other part, and the two parts are superimposed on the video display. Each part of the stereogram is selectively presented to a different eye of a viewer by chromatically selective filters worn over the eyes. The dots are produced by the binary sequences of 1's and 0's generated by the BSG. As will be described, the BSG may be used to create a pseudorandom binary sequence, and the same sequence may be applied to both the fixed and variable delays, in which case the binary sequences output from the two delays will be identical. However, one will be shifted relative to the other by the relative time delay between the two delays. A logic 1 in the sequences results in a red dot (or element) and its twin green dot being produced on the display, and the time delay between the two delays determines the horizontal distance between the twin dots, i.e., the disparity. If the delays are equal, the red and green dots would be coincident and the disparity would be zero. The video image or pattern created by the video source is used to determine which delay output is applied to which gun of the video display. This may be accomplished by establishing a threshold level for the gating control switch 28 such that when the video image signal is above the threshold, e.g., at a white video level, the switch is in a first position at which the red dot preceeds the green dot on the display, and when the video signal is below the threshold, e.g., at a black video level, the switch is in a second position at which the green dot preceeds the red dot. Thus, in an area on the screen corresponding to white, all green dots would be to the right of their twin red dots, and conversely for areas on the screen corresponding to black. When the screen is viewed through chromatic filters, the white areas of the DRES can exhibit convergent disparity and the black areas exhibit divergent disparity to appear, respectively, nearer to and further from the viewer. If the video image comprises, for example, a white square centered on a black background, the elements of the display within the area of the square will appear to stand out from the elements within the surrounding background area and will appear to be closer to the viewer.

Figure 2:
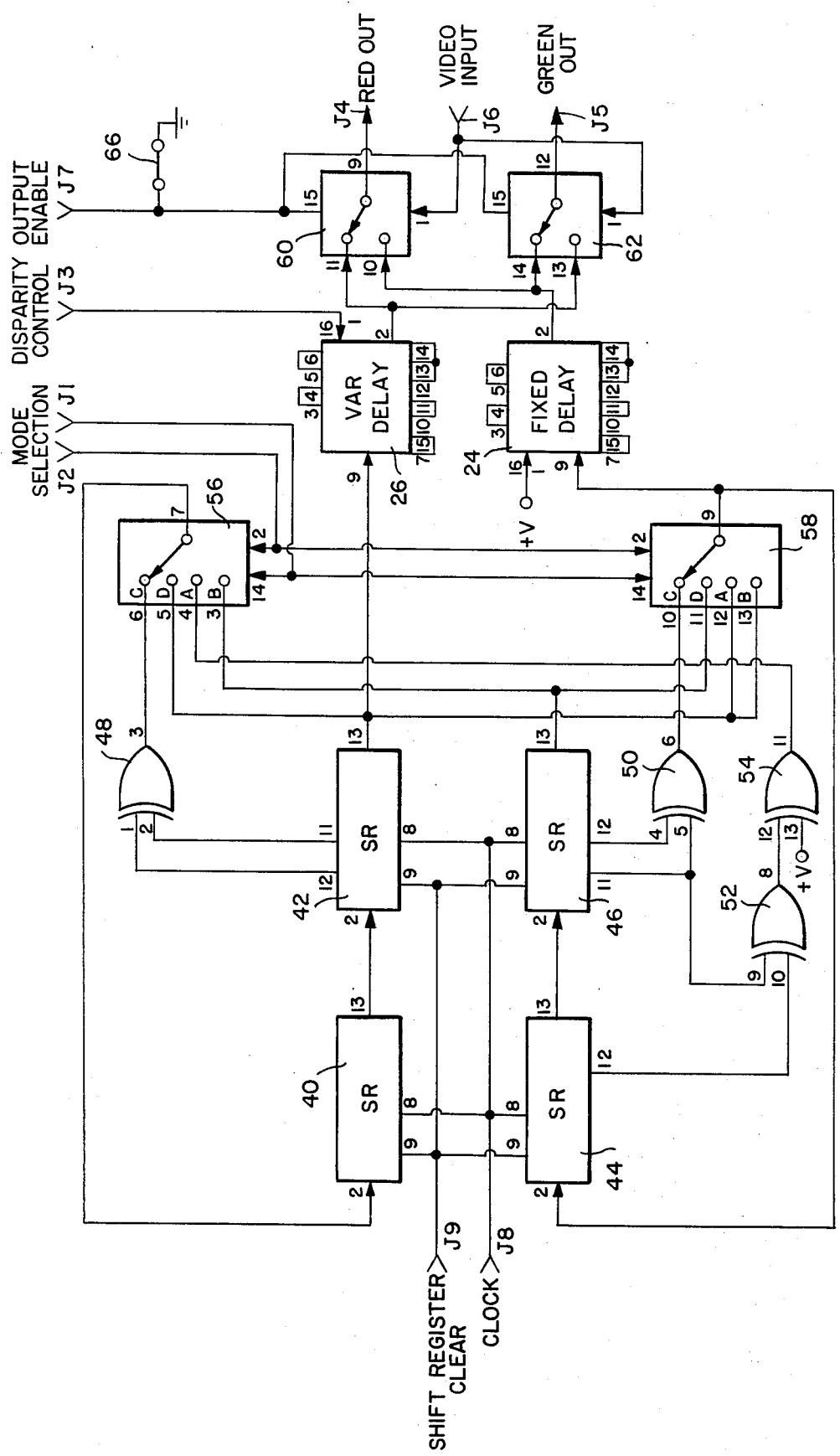
FIG. 2 is a block diagram illustrating the interface apparatus of FIG. 1 in more detail.

FIG. 2 illustrates a preferred embodiment of interface circuit 20 which may be implemented with nine inexpensive commonly available integrated circuits. As noted earlier, video source 12 is preferably a home-type computer since this provides a particularly convenient and easily controllable source of video signals, as well as clock and sync signals. A computer also serves as a particularly convenient way of controlling the operation of the interface circuit, as will be described. Accordingly, the remainder of this description will assume that video source 12 is a computer. The system has been implemented with an APPLE II+, an Ohio Scientific Instruments Challenger C1P, and a Timex Sinclair computer; however, other computers capable of black and white graphics may also be employed. In FIG. 2, the numerals adjacent to the inputs and outputs of the various blocks refer to integrated circuit pin numbers.

Referring to FIG. 2, the binary sequence generator 22 may be implemented using four 8-bit shift registers (such as type 74164 integrated circuits) 40, 42, 44 and 46. The 8-bit shift registers are connected together in pairs as shown to form two 16-bit shift registers (40-42 and 44-46). The shift registers are clocked by a clock signal at J8 and may be cleared by a clear signal at J9. Three exclusive-OR circuits 48, 50 and 52 having their inputs connected to selected output stages of the shift registers provide feedback signals which may be applied to the inputs of the shift registers so that the shift registers may be configured as linear recursive binary sequence generators. A fourth exclusive-OR circuit 54 connected to the output of exclusive-OR 52 and to +V functions as an inverter. As shown, the outputs of exclusive-OR's 48 and 50, inverter 54, and shift registers 42 and 46 may be applied to selected inputs of two single pole four throw switches 56 and 58 (such as a type 74153 dual 1 of 4 data selector integrated circuit), and the outputs of data selectors 56 and 58 may be respectively applied to the inputs of shift registers 40 and 44. The two data selectors may be controlled by logic signals at J1 and J2 from mode selection device 30 (FIG. 1) to enable the shift registers and exclusive-OR's to be configured in four different sequence-generating modes (which will be described shortly). The output of shift register 42 is also applied to the input of variable delay 26, and the output of data selector 58 is applied to the input of fixed delay 24.

The fixed and variable delays may be implemented by utilizing the propogation delay versus voltage characteristics of CMOS integrated circuits. Each delay may comprise a type CD 4010 CMOS HEX buffer, the pins of which are connected together as shown so that the buffers of each integrated circuit are connected together in a daisy chain. The power supply input to the fixed delay 24 is connected to +V (+5 volts), and the daisy chained buffers of the fixed delay provide an input to output propogation delay of the order of 500 nsec (nanoseconds). The power supply input to the variable delay 26 is connected at J3 to the disparity control 36 (FIG. 1) which provides a variable control voltage, preferably in the range of +7 to +3 volts, to the variable delay. The disparity control 36 may comprise a variable DC voltage power supply or a variable function generator (for a purpose to be described hereinafter). The disparity control enables the input to output propogation delay of the variable delay 26 to be adjusted continuously from about 300 to 750 nsec for voltages ranging between +7 and +3 volts, thereby affording relative delays between the fixed and variable delays of the order of −200 to +250 nsec. For a 12-inch display viewed from a distance of one meter, the relative delay, i.e., disparity, corresponding to stereoacuity threshold is of the order of 10 nsec. Therefore, this relative delay range affords a rather large range of useful disparities.

The gating control switch 28 of FIG. 1 may be implemented by a pair of 1 of 2 data selectors 60, 62, such as part of a type 74157 quad 1 of 2 data selector integrated circuit, connected as shown to the outputs of delays 24 and 26. Data selector 60 provides the red output signal to the video display at J4, and data selector 62 provides the green output signal at J5. The video signal is input at J6 and is applied to both data selectors 60 and 62. Each data selector serves as a single pole double throw switch, the position of which is controlled by the voltage applied to pin 1. For voltages less than a threshold (of the order of 1 volt for the integrated circuit), the data selectors are in a first position such that, for example, the red output signal at J4 corresponds to the output of variable delay 26 and the green output signal at J5 corresponds to the output from the fixed delay 24, as shown. When the input voltage at pin 1 increases above the threshold, each data selector switches to select the output from the other delay. Accordingly, by adjusting the video input signal such that the video black level is at ground and the video white level is at a voltage (5 volts, for example) above threshold, the video signal determines which delay is applied to which color output. Pin 15 of the data selectors 60 and 62 is an output enable control and is normally grounded. However, this pin may be connected to ground through a switch 66, as shown, to enable an external output enable signal to be applied at J7, for example, a gate control signal or another video signal as from a video camera.

As previously mentioned, the shift registers and the exclusive-OR's may be configured in different sequence-generating modes to provide different binary sequences by applying mode selection logic signals at J1 and J2. Four different sequence-generating modes, designated A-D, are possible for the arrangement illustrated in FIG. 2. The positions of the 1 of 4 data selectors 56 and 58 for each of the four modes is indicated in FIG. 2, and FIG. 3 illustrates, for each mode, the equivalent configuration of the sequence generator and the mode selection signals at J1 and J2 for selecting that mode.

Referring to FIG. 3, mode A is selected by applying a logic 1 to J1 and a logic 0 to J2. In mode A, the shift registers are connected together in series to provide a 30 stage pseudorandom sequence generator that generates a linear recursive binary sequence having a sequence length of 1,073,215,489 bits, which at the clock rates used (2–4 MHz) does not repeat for many hours. The outputs of stages 23 and 30 are combined in exclusive-OR 52, the output of which is inverted by inverter 54, and applied as a feedback signal to stage 1. The output of the generator is taken from stage 16 and is applied to both variable delay 26 and fixed delay 24. The shift registers may be clocked by a clock signal at J8 from either the computer or from an external clock 32 (FIG. 1). In this mode, the shift registers are not cleared and it is desirable that the shift register clear input at J9 be connected to +V, as by a switch 70 (FIG. 1). Mode A is the only self-starting mode and must be entered first.

In mode B, the shift registers are reconfigured as a 32 stage recirculating memory, and a pseudorandom bit sequence originally generated in mode A will be stored and continuously repeated. As with mode A, the same sequence is supplied to both the variable and the fixed delays.

Unlike modes A and B, in modes C and D different binary sequences are applied to the two delays. These modes are not needed to produce DRES, but create bit sequences that are statistically independent between the two eyes, which could be useful in exploring binocular rivalry or analogous phenomenon.

In mode C, the shift registers are configured into two independent 15 stage pseudorandom binary sequence generators which generate binary sequences having a length of 32,767 bits. Each sequence generator will be preloaded with a different bit sequence since mode A must have been selected first in order to enable generator startup. In this mode, the display will display one collection of randomly placed red dots and an independent sample of randomly placed green dots. Whether or not any of these dots appear to be twins is a matter of chance. Most dots shown to one of the eyes in the this mode will not have spatially corresponding twin dots shown to the other eye, since the red and green guns of the display are activated by independent sequences.

Mode D reconfigures the shift registers into two independent 16-bit recirculating memories, thus allowing an interocularly independent sequence created in mode C to be retained, as for inspection or for calibration purposes.

If desired, mode selection may be performed under the control of the computer. By rapidly alternating between the different modes, the system may be employed for studying different phenomenon. For example, even the best controlled stereograms contain a few non-twin dots as an unavoidable consequence of having slightly different disparities on different areas of the display (due, for example, to non-linearities in the display), and the significance of these effects is poorly understood. By alternating between modes A and C, controlled amounts of non-twin dots may be injected into a DRES to enable study of such effects.

The system of FIG. 1 may be operated either synchronously or asynchronously, depending upon whether the clock which drives the shift registers is frequency related to the video signal or not. For asynchronous operation, the clock is independent of the video signal and may be derived from either an exernal clock generator or from the computer itself. For example, the APPLE II+ makes available a 2 MHz clock signal on pin 37 of its peripheral connectors which may be used to clock the shift registers. For generating DRES, mode A should be selected. Prior to actual use, the system should be calibrated, which can be done by measuring the disparity as a linear distance on the display itself. In order to calibrate the system, it is necessary to generate stable calibration patterns. The calibration pattern preferably comprises stable vertical bars produced by both the red and green guns of the display. Where the bars overlap, a typical observer sees a yellow bar. Any horizontal offset or displacement between a bar generated by the red gun and the corresponding bar generated by the green gun is the disparity, and can be measured as a linear distance on the display. A stable vertical bar generation pattern can be generated by applying the isolated sync signal from the computer to the shift register clear input J9 (FIG. 2). The computer itself may also be used to control the calibration pattern in the same way that it controls a DRES. For example, by generating a video image that corresponds to white on the top half of the screen and black on the bottom half, it can display convergent disparity on the top half and divergent disparity on the bottom half during DRES. However, when using the isolated sync signal to clear the shift registers during generation of the calibration pattern, the video signal will cause offsets between the bars in different directions on the top and bottom halves of the display.

For synchronous operation, the clock input to the shift registers is synchronized with the video signal, which is best accomplished by deriving the clock from the same oscillator that is employed for generating the video signals. The C1P computer, for example, outputs a video sync that is derived from a 4 MHz master crystal oscillator, which serves as a convenient clock signal. In general, it is desirable to use as high a clock frequency as possible. A 4 MHz clock signal produces a nice symmetrical dot on the display. As the clock frequency is reduced, the horizontal extent of the dot tends to increase, and the dot assumes more of a rectangular shape. Synchronous operation is preferable to asynchronous operation, since it enables all four sequence generation modes A–D to be utilized, although asynchronous operation gives acceptable results.

For synchronous operation, switch 70 (FIG. 1) connected to the shift register clear input J9 is positioned to apply +V to the shift register clear input. In mode A, the system generates DRES as previously described. Mode B is employed for calibration pattern generation. When this mode is selected, vertical bars will appear on the display, in a manner similar to that described for calibration pattern generation in asynchronous operation. However, during synchronous operation, the bars will be of various widths on the display (as determined by the binary sequence in the recirculating register).

As noted earlier, the red and green output signals from the interface circuit are applied directly to the corresponding color guns of the video display. If a color video monitor is employed, these outputs may be connected directly to the corresponding red and green inputs normally provided on such monitors, and the video sync signal can be applied directly to a video sync input of the monitor. If a standard color television receiver is employed as a display, the color output signals may be AC coupled to the bases of the drive transistors of the corresponding color guns, and the sync signal may be applied to a conventional RF modulator connected to the tuner input.

Since the interface circuit enables disparity to be controlled by an analog voltage, both DRES and calibration patterns may be generated by connecting a varying voltage, as from a function generator, to the disparity control input J3. In this case, the video signal from the computer is not needed and random element stereograms can be created without a video signal. Using a function generator, for example, horizontally oriented depth corrugations may be generated on a DRES anaglyph display when the function generator inputs a signal having a frequency that is a harmonic of the 60 Hz vertical raster frequency. The higher the harmonic, the greater the number of corrugations which are displayed. Vertically oriented corrugations may similarly be generated by inputs that are harmonics of the 15,750 Hz horizontal raster frequency. The disparity of the patterns will vary in accordance with the input voltage on J3. Since the delay of variable delay 26 is nonlinear with voltage, if the output from the function generator covers the full 4 volt (+7 to +3 Volt) range, some distortions will occur. However, if the amplitude or the input waveform is maintained between +5 and +7 Volts, the distortions will be relatively small, and a sinusoidal input, for example, will produce a nearly sinusoidal profile for the depth corrugations. It is also possible, for example, to control disparity with a video signal on input J3.

The foregoing has been concerned principally with anaglyph-type presentations. The system, however, may also be employed for a split screen presentation, which is particularly useful for presenting DRES on a black and white display. In the split screen method, one part of the stereogram is produced on one half of the screen, while the twin part is produced on the other half, and the screen is viewed with the aid of a septum or a similar device so that each eye is exposed to only one half of the screen. It is also desirable to employ the computer for controlling mode selection of the binary sequence generator.

DRES generation for a split screen presentation involves interleaving on each horizontal raster line of the display modes A and B. Mode A is entered each time the horizontal sync pulse occurs to generate a new pseudorandom sequence. Mode B is selected at the end of this sync pulse so that the recirculating memory configuration repeats the same sequence every eight microseconds (32 stages clocked at 4 MHz) along the raster line. As long as the video signal is synchronous with the clock, twin dot sequences will occur on the left and right halves of the screen. The generation of a new random sequence for every horizontal line ensures that the bit pattern appears as random as if Mode A had been selected continuously. Also, the graphics software used for the split screen presentation is different from that used for the anaglyph presentation. Anaglyphs cover the entire screen with a single image, and utilize two different colored adjacent dots to present disparity, while the split screen presentation uses a single output to display complimentary images on the two halves of the screen. A video pattern displayed in white and black on the left half of the screen must be inverted to a corresponding black and white pattern on the right half. The graphics image must be created so that the corresponding pattern features on the two halves of the screen select twin dots, which is related to the 8 microsecond recirculation rate for the mode B pattern. The C1P microcomputer is particularly convenient in that the 8 microsecond recirculation time is the same as the time required to display four graphics characters. A character displayed on the left half of the screen and its inverse character displayed on the right half will select twin dots when the distance between them is divisible by four characters. Bit plot graphics software can also be employed to ensure the correct relative positions for the patterns on the two halves of the screen.

To generate a calibration pattern, mode B is selected continuously. A pattern of vertical bars similar to those previously described will be produced on the display. Calibration involves measuring the horizontal offsets between the vertical bars. The horizontal offsets will be in different directions, but the same size, and will be produced on corresponding parts of the pattern on the left and right halves of the screen.

FIG. 4A illustrates a circuit for providing a split screen presentation on a standard television receiver. One of the color output signals from the interface circuit, the red, for example, may be summed with the sync signal to provide a composite black and white video signal. This may be accomplished by connecting the red output signal and the sync signal to opposite sides of a potentiometer 80, the wiper of which is connected to the RF modulator 16. The output from the RF modulator may be applied directly to the antenna input of the TV. The potentiometer is useful for enabling the relative porportions of the red output signal and the sync signal to be varied in the composite signal.

An important virtue of DRES is that monocularly recognizable cues about the displayed depth pattern are absent. However, it is often useful to include monocular cues, especially when the observers are inexperienced, so as to promote more rapid stereoscopic fusion. FIG. 4B illustrates a modification of the circuit of FIG. 4A that permits an adjustable mixture of DRES with the video image. As shown, the composite signal from the wiper of potentiometer 80 may be combined with a composite video signal in another potentiometer 82, the wiper of which is connected to an emitter follower comprising a transistor 84 and a resistor 86. The output of the emitter follower is applied to the RF modulator 16. At one extreme position of potentiometer 82, a pure DRES display is obtained. At the other extreme of the potentiometer, a pure video display is obtained. Intermediate settings allow various contrasts between DRES and the video image to be obtained so that monocular cues can be faded in or out of the display as desired. FIGS. 5A-E illustrate typical waveforms at correspondingly lettered points in the circuits of FIG. 4A and B.

From the foregoing, it will be appreciated that the invention affords a rather simple, inexpensive and versatile apparatus and method for producing three-dimensional displays, such as dynamic random element stereograms, on conventional video display devices. Moreover, while the foregoing has described preferred embodiments and applications of the invention, it will be appreciated by those skilled in the art that numerous changes can be made in these embodiments without departing from the principles and the spirit of the invention, the scope of which is defined in the appended claims.

I claim:

1. Apparatus for producing a three-dimensional display on a video display device of the type which displays images in frames composed of a plurality of scan lines, the apparatus comprising element generator means for generating signals corresponding to pairs of elements to be displayed on the video display device, means for applying said signals to the video display device such that the elements constituting an element pair are displayed on the same scan line of the video device, a video signal source for producing a video signal defining a predetermined image, and means responsive to the video signal for producing disparity between the elements of the pairs of elements displayed during selected portions of the predetermined image such that said selected portions appear to be at a different distance from a viewer than non-selected portions of of the predetermined image.

2. The apparatus of claim 1, wherein said element generator means comprises sequence generator means for generating binary sequences having first and second logic states, said elements being displayed when the binary sequences are in the first logic state.

3. The apparatus of claim 2, wherein said sequence generator means comprises a pseudorandom sequence generator and the three-dimensional display is a dynamic random element stereogram.

4. The apparatus of claim 3 further comprising means for controlling the sequence generator such that it generates different binary sequences.

5. The apparatus of claim 4, wherein said control means includes means for causing the sequence generator to generate repetitively selected sequences of predetermined lengths.

6. The apparatus of claim 2, wherein said disparity producing means comprises means for receiving a binary sequence from the sequence generator means and for producing first and second output binary sequences, and means for delaying one output binary sequence with respect to the other output binary sequence.

7. The apparatus of claim 6, wherein each output binary sequence produces one element of each of said pairs of elements.

8. The apparatus of claim 7, wherein said delaying means comprises a fixed delay circuit from which the first binary sequence is output and a variable delay circuit from which the second binary sequence is output.

9. The apparatus of claim 8, wherein the variable delay circuit is voltage controllable, and wherein control means is included for controlling said variable delay circuit.

10. The apparatus of claim 9, wherein said variable delay circuit comprises a CMOS integrated circuit, and wherein said control means includes means for controlling the voltage applied to said integrated circuit.

11. The apparatus of claim 10, wherein said control means comprises a function generator for generating a predetermined waveform.

12. The apparatus of claim 6, wherein the disparity producing means further comprises switching means having first and second outputs and receving the first and second binary sequences and for switching the first and second binary sequences between said first and second outputs.

13. The apparatus of claim 12, wherein said switching means is controlled by said video signal.

14. The apparatus of claim 13, wherein said video display device comprises a color display device, the first and second outputs of the switching means being adapted for connection to respective first and second color guns of said color display device such that the binary sequence at the first output causes elements of the first color to be displayed and the binary sequence at the second output causes elements of the second color to be displayed.

15. The apparatus of claim 14, wherein said video signal controls said switching means such that the elements of the first color are delayed with respect to the elements of the second color during said selected portions of the predetermined image.

16. The apparatus of claim 2, wherein said video signal source further generates a clock signal that is applied to said sequence generator, and said clock signal is synchronous with the video signal.

17. The apparatus of claim 2, wherein the sequence generator is driven by a clock signal that is asynchronous with respect to the video signal.

18. The apparatus of claim 2, wherein said video display device is a black and white display device and said video signal defines said predetermined image on a first part of the display and defines the inverse of said predetermined image on another part of said display.

19. The apparatus of claim 18, wherein one element of each of said pairs is located in the first part of the display and the other element of said pair is located in said other part of the display.

20. The apparatus of claim 19, wherein the elements displayed in the first part of the display are produced by binary sequences that are repeated in the other part of the display to display the other elements of the pairs.

21. The apparatus of claim 19, wherein the disparity producing means comprises delay means that introduces a relative displacement between the position of an element in the first part of the display with respect to the predetermined image and the position of an element in the other part of the display with respect to the inverse of the predetermined image.

22. The apparatus of claim 18 further comprising means for combining an output from the disparity producing means with a video sync signal and for supplying the combined signals to the video display device.

23. The apparatus of claim 22, wherein said combining means further comprises means for combining the video signal with said combined signals so as to afford contrasts in said display.

24. The apparatus of claim 2, wherein said video signal source comprises a microcomputer, and said predetermined image comprises a graphics image generated by said microcomputer.

25. The aparatus of claim 24, wherein said microcomputer controls said sequence generator to generate different binary sequences.

26. Apparatus for producing a three-dimensional random element stereogram display on a video display device of the type which displays images in frames composed of a plurality of scan lines, the apparatus comprising pseudorandom sequence generator means for generating a pseudorandom binary sequence, fixed delay means receiving the binary sequence for delaying the binary sequence by a predetermined amount, variable delay means receiving the binary sequence for delaying the binary sequence by a variable amount relative to said predetermined amount, means receiving the binary sequences from said fixed and variable delay means and for applying said binary sequences to the video display device so as to display randomly thereon pairs of elements, one element of each pair being produced by the binary signal from the fixed delay means and the other element of the pair being produced by the binary sequence from the variable delay means, said one element and said other element of the pair being displayed on the same scan line of the video display device, and means for controlling the variable delay means so as to vary the delay between elements of pairs displayed during selected portions of the display relative to the elements of pairs displayed during non-selected portions so as to cause the selected portions of the display to appear to be at a different distance from a viewer than said non-selected portions.

27. The apparatus of claim 26, wherein said variable delay means comprises a voltage controllable integrated circuit, and said control means comprises a variable voltage source.

28. The apparatus of claim 27, wherein said voltage source comprises a function generator.

29. The apparatus of claim 27, wherein said voltage source comprises a video signal source.

30. A method of producing a three-dimensional display on a video display device of the type which displays images in frames composed of a plurality of scan lines, the method comprising generating first and second binary sequences, the sequences having first and second logic states, applying said first and second sequences to the video display device to display pairs of elements, each sequence producing one element of a pair and the elements of a pair being displayed on the same scan line, generating a video signal defining a predetermined image, and delaying said first and second binary sequences relative to one another in accordance with said video signal such that during selected portions of the predetermined image a first element of each pair is delayed with respect to a second element of the pair and such that during non-selected portions of the predetermined image the second element is delayed with respect to the first element.

31. A method according to claim 30, wherein said delaying comprises delaying the first binary sequence by a fixed amount and delaying the second binary sequence by a variable amount.

32. The method of claim 31 further comprising controlling said variable amount so as to vary the displacement on said display device between the elements of pairs displayed during said selected portions.

33. The method of claim 30, wherein said delaying further comprises switching the first and second binary sequences between first and second inputs of the video display device in accordance with said video signal.

34. The method of claim 33, wherein said video display device is a color video display device, and wherein said first and second elements of said pairs are displayed as different color dots.

* * * * *